United States Patent

Perga et al.

[15] 3,657,892
[45] Apr. 25, 1972

[54] EXHAUST GAS TREATMENT SYSTEM

[72] Inventors: Martin W. Perga, Hoffman Estates; Ted V. DePalma, Roselle, both of Ill.

[73] Assignee: Universal Oil Products Company, Des Plaines, Ill.

[22] Filed: June 29, 1970

[21] Appl. No.: 50,590

[52] U.S. Cl. ................................ 60/274, 60/287, 23/2 E, 23/288 F
[51] Int. Cl. ........................................ F01n 3/02, F01n 3/14
[58] Field of Search ...................... 60/29, 30; 23/2 E, 288 F

[56] References Cited

UNITED STATES PATENTS 2,488,563  11/1949  Sills ............................................. 60/29
2,942,932  6/1960  Elliott ......................................... 60/30

*Primary Examiner*—Douglas Hart
*Attorney*—James R. Hoatson, Jr. and Ronald H. Hausch

[57] ABSTRACT

An exhaust gas treatment method and system for an internal combustion engine utilizing a catalytic converter, wherein carbon or charcoal is incorporated into the system so that the gases $H_2$ and CO can be produced by the dissociation of water, present in the exhaust gas, and the partial oxidation of the carbon to become a secondary fuel for a catalytic conversion zone of the converter. In a preferred embodiment at least a portion of the exhaust gases are caused to pass through a bed of carbon under predetermined conditions prior to their entry into the catalytic converter intermediate between engine startup and a predetermined high limit temperature.

3 Claims, 2 Drawing Figures

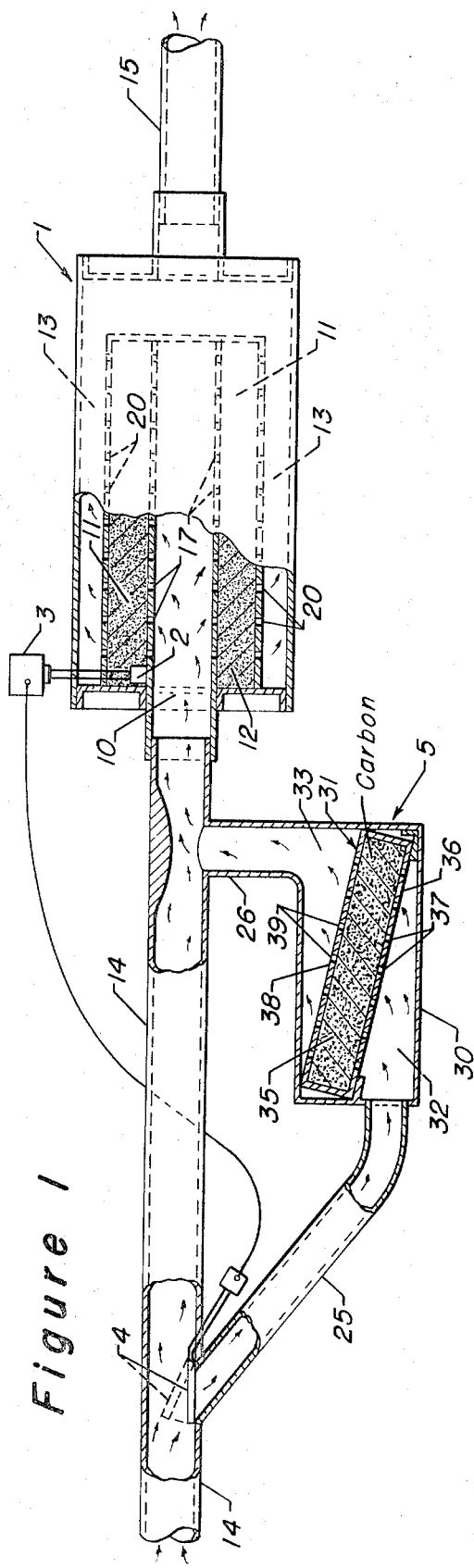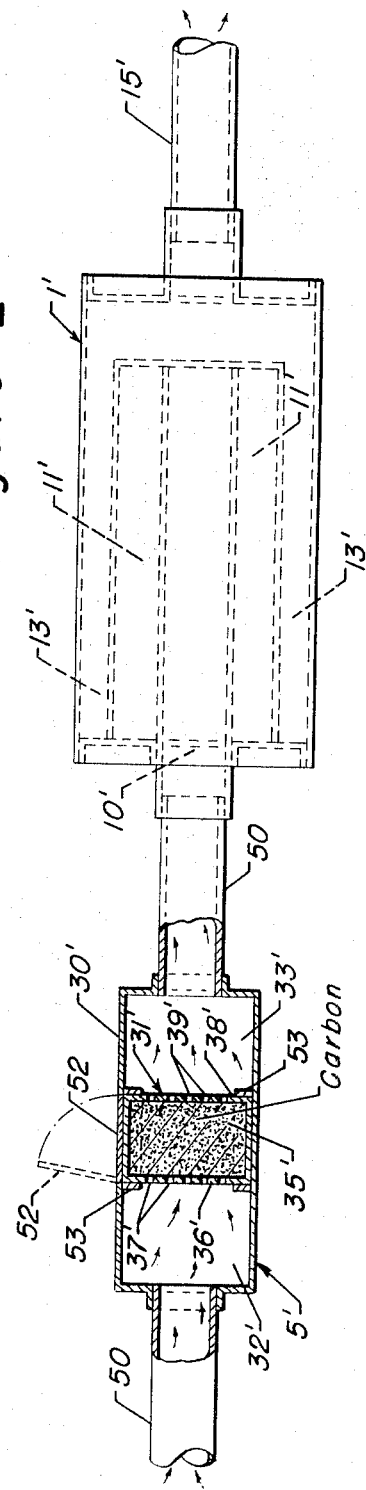

EXHAUST GAS TREATMENT SYSTEM

This invention relates to a method and system for effecting the treatment of exhaust gases emitted from an internal combustion engine. Particularly, it is directed to a method and/or system which is ideally suited for the elimination of soot carried by exhaust gases and which utilizes carbon or charcoal as a source of secondary fuel to maintain a conversion zone at predetermined temperature levels.

The desirability of removing or converting the noxious compounds of vehicular exhaust gases has been generally well established. The unavoidably incomplete combustion of hydrocarbon fuel by an internal combustion engine results in the generation of substantial quantities of unburned hydrocarbons, and undesirable products, which as waste products, discharge into the atmosphere through the exhaust line. Such partially oxidized products, and part of all these components, contribute to the air pollution problem presently facing various geographical areas of the world.

In a catalytic operation, the hot gases issuing from a motor exhaust manifold are passed through a catalyst retaining section or conversion zone maintained within a converter, so as to effect a more or less complete oxidation of carbon monoxide and unburned hydrocarbons present in the exhaust stream.

It has been found that one of the difficulties encountered in the utilization of catalytic converters for effecting the oxidation of exhaust gases arises at relatively low temperatures where "poisioning" of the catalyst material occurs. For instance, it has been found that in diesel-powered vehicles which operate a large percentage of time in idle or low power modes, the engine effluent of these lower power modes is so low in temperature that even high active oxidation catalysts fail to cause burning of the undesirable condensed carbonaceous material (soot) in the effluent, which in turn tends to reduce the efficiency of the converter. It has been found, however, that at certain high temperature levels this sort of catalyst "poisoning" can be prevented.

Therefore, it is a principal object of this invention to provide means that will maintain relatively high temperature levels will, in turn, increase catalyst efficiency and provide for an improved exhaust gas treatment method and system for treating the exhaust gases of an internal combustion engine.

More particularly, it is an object of this present invention to provide an exhaust gas treatment method and system for treating exhaust gases of a diesel engine that effectively eliminates the effect of soot "poisoning" on catalyst material within the conversion zone of a catalytic converter.

Another object of this invention is to provide an exhaust gas treatment method and system for introducing a secondary fuel into a converter at proper temperatures so as to effectively burn or oxidize a particular type of "poisonous" deposit or undesirable material within the conversion zone of the catalytic converter.

It is another object of this invention to provide an exhaust gas treatment method and system for introducing a secondary fuel, in the form of gaseous CO and $H_2$, into a converter at proper temperatures so as to effectively oxidize soot deposits within the conversion zone of the catalytic converter.

Broadly, this invention is a method of catalytically treating a stream of exhaust gases emitted from an internal combustion engine to preclude the deposition of undesirable material on a catalyst comprising the steps of: (a) passing at least a portion of the untreated stream of exhaust gases through a carbon zone during predetermined conditions, wherein partial oxidation of the carbon and dissociation of water present in the exhaust gases will produce gaseous hydrogen and carbon monoxide, and, (b) passing the total untreated stream of exhaust gases, including stream carbon monoxide or hydrogen produced in said carbon zone through a catalytic conversion zone, wherein said stream of gases is catalytically oxidized to a treated state, whereby the addition and subsequent oxidation of said gaseous hydrogen and carbon monoxide will raise the energy of said conversion zone to sustain the combustion of said undesirable material without the need of separate ignition means.

It will be noted that this method makes use of the fact that exhaust gases from internal combustion engines contain water at a raised temperature and that carbon will dissociate water at such temperature levels into carbon monoxide and/or hydrogen.

The method as set forth is applicable to both spark-ignition type internal combustion engines and compression-ignition type internal combustion engines; however, it is especially useful in conjunction with a diesel or compression-ignition type engine, which in most utilizations operates a large percentage of the time in idle or low power modes. The engine effluent at such low power modes is so low in temperature that even very highly active oxidation catalysts fail to cause the burning of condensed carbonaceous material (soot), which has been found to include relatively stable hydrocarbons, in the effluent. Soot does not cause catalyst "poisoning" in the same sense as does the lead of leaded gasolines, but on the other hand, it does lower the efficiency of a converter by blockage of access to much surface and porous areas of the catalyst material within the converter and by raising the pressure drop through the conversion zone. The present method is highly susceptible to use in burning the soot off the catalyst material for the temperature at which the soot is oxidized is relatively low as opposed to combustion temperatures of other "poisonous" materials. For example, it has been found by utilizing a catalyst material having 0.5 percent platinum by weight, and utilizing the exhaust gases from a diesel engine as the supply of any oxygen, soot was eliminated by catalytic oxidation from a temperature range of about 600° F. to about 800° F.

Preferably, to prevent the conversion zone from overheating, the passing of gases through the carbon bed will be terminated when the temperature conditions of the catalytic conversion zone is equal to at least the temperature where the undesirable material in the presence of the stream of exhaust gases in the catalyst material zone will be sustained. This temperature level is dependent on the particular undesirable material which is to be precluded, the operating conditions of the engine, and the type of catalyst material within the catalytic conversion zone. It has been found that, by utilizing a platinum surface impregnated catalyst of 0.5 percent platinum by weight, the combustion of undesirable carbonaceous material from an effluent emitted from a two-cycle diesel engine will be sustained, is from a temperature range of about 600° F. to about 800° F. and above.

Also considered as part of this invention is an improved apparatus system for carrying out the method, as heretofore set forth, which comprises: a catalyst converter having: a catalyst retaining section with catalyst material therein, gas inlet means communicating with said catalyst retaining section for introducing untreated exhaust gases therein, and gas outlet means communicating with said catalyst retaining section for distributing treated gases downstream from said converter; a carbon retaining section having carbon material therein; a second gas inlet means communicating with said carbon retaining section for introducing a portion of the untreated exhaust gases therein; and, a second gas outlet means from said carbon retaining section and communicating with the carbon retaining section and with the gas inlet means of said converter, whereby gases which have passed through said carbon retaining section are introduced into said converter.

The carbon retaining section may be put directly in series with the converter or it may be placed in a secondary slip stream. When placed in a slip or secondary stream, it is possible to make provisions for preventing the overheating of the converter and for preventing carbon waste. In such a case, a sensor means is provided, communicating with the converter or a part of the engine system for sensing changing temperature-dependent conditions within the converter. A valve means is provided for controlling the amount of exhaust gas flow into the carbon retaining section, and an actuator means is connected to the valve and the sensor means, the actuator means operating responsive to the sensor means for controlling the valve means at predetermined temperature-dependent conditions of said converter. The actuator means may be a switch which is preferably adjusted to open the valve at engine startup and close the valve at least at the temperature where the combustion of the undesirable material will be sustained in the presence of the stream of exhaust gases in the catalyst material section. Normally, the switch will be adjusted so that the temperature limit, above which where the valve will be closed, is an increment above the temperature where the combustion of the undesirable material will be sustained. Above that temperature the valve will be closed by the switch. Thus, secondary fuel in the form of hydrogen gas and carbon monoxide will be introduced into the catalyst retaining section to be oxidized therein so as to raise the temperature of the converter to such a point where the undesirable material such as soot will be oxidized. The sensor means may be a bimetallic thermostat within the catalyst retaining section which would communicate its information to the actuator means, but on the other hand may include devices adjusted to sense the fuel pressure of the vehicle or the setting of the throttle, since in most instances these variables will indicate changing temperature conditions of the converter to some extent.

The foregoing method and the improved exhaust gas system for carrying it out, as well as other advantageous features in connection therewith, are better set forth and explained by reference to the accompanying diagrammatic drawing and the following description of the improved exhaust gas system.

FIG. 1 is a schematical representation of a preferred embodiment of the exhaust gas system of this present invention.

FIG. 2 is an alternative embodiment of the exhaust gas system of this present invention utilizing a carbon retaining section connecting in series with a converter.

With reference to FIG. 1 of the drawing, there is shown a catalytic converter 1, a sensor means 2, an actuator means 3 connected to the sensor means 2, a valve means 4, and a carbon chamber 5. The catalytic converter 1 has a gas inlet means or manifold section 10 communicating with a catalyst retaining section 11 which has catalyst material 12 therein, and which in turn communicates with a gas outlet means or manifold section 13. The converter is connected to the exhaust manifold of an internal combustion engine or to another part of the exhaust system via a conduit 14. The outlet section 13 may connect to the remaining portion of the exhaust system via conduit 15. Typically, the exhaust gases issue from the exhaust ports of the internal combustion engine and finally make their way through conduit 14 into the inlet gas manifold 10 where they are distributed via perforations 17 through the annularly shaped catalyst retaining section 11, wherein the gases contact the oxidation catalyst material 12. After catalytic oxidation or conversion, the treated gases pass through the perforations 20 into gas outlet manifold 13 and then through conduit 15. Utilizing this particular converter in conjunction with the present invention should not be considered limiting for other configurations and other concepts of converter design may well be used. For example, an "out-to-in" type converter may well be used; however, it is thought that an "in-to-out" flow arrangement has the advantage in that it tends to conserve the sensible heat within the incoming exhaust gases.

Referring now to the improved exhaust gas treatment system in more detail, there is shown a temperature-change responsive sensor means 2, which may be a bimetallic thermostat, connected to the converter within the catalyst retaining section. The location illustrated should not be limiting upon this present improvement for it is contemplated that sensor means may be placed in various places within the converter and still maintain its function of sensing changing temperature-dependent conditions within the converter. Also, it is contemplated that other forms of sensing devices be used to sense changing temperature-dependent conditions of the converter particularly since, in connection with diesel engines, the mode of operation will greatly effect the temperatures within the converter. For example, during the idle mode, a diesel engine will emit exhaust gases from a range of about 200° F. to about 300° F. These relatively low temperatures will effect the temperature of the converter. Thus, a device that is sensing the fuel pressure to the engine or the throttle setting will suffice as a sensing means that senses changing temperature-dependent conditions within the converter.

Connecting to the sensor means is the actuator means or switch 3, which may be a limit-type electrical switch that is adjusted to control valve 4 in conduit 14. Valve 4 controls the amount of exhaust gases that reach the carbon chamber 5 via conduit 25. The carbon chamber 5 is disposed in the slip stream established by conduit 25 connecting to conduit 14 and conduit 26 connecting to conduit 14 downstream of the carbon chamber. Chamber 5 comprises an outer housing 30 in which a carbon retaining section 31, which may be of a cartridge form, is disposed in a spaced relation with the inner walls of the housing 30 to form a gas inlet means or manifold section 32 and a gas outlet means or manifold section 33. Within the carbon retaining section 31 are located carbon particles 35 which are preferably of the activated type. The carbon retaining section communicates with the inlet means 32 via wall 36 having perforations 37 therein, and with outlet means 33 via wall 38 having perforations 39 therein. The actuator means or switch 3 is adjusted so that it will open the valve means to the position as shown with dashed lines at engine startup and will close the valve when the conditions within the converter 1 are at least at the temperature where the combustion of the undesirable material, such as soot, in the presence of the stream of exhaust gases in the catalyst retaining section 11 will be sustained.

It is seen that once the engine is started, valve 4 will be opened by switch 3 to introduce a portion of the exhaust gases of the engine into the carbon retaining section, wherein gaseous Co and $H_2$ is produced. These gases are then passed into the catalyst retaining section to thus accelerate the rise in temperature within the converter. At the high limit temperature, switch 3 will close valve 4 to stop the introduction of CO and $H_2$ into the converter. Since this high limit temperature is difficult to definitely ascertain, a safety feature may be and preferably is incorporated into the system. That is, the temperature adjustment on switch 3 is preferably set at a predetermined increment above the combustion temperature of the undesirable material in the presence of the stream of exhaust gases and catalyst material. In addition, to establish a stable operating range, the temperature adjustment of switch 3 is preferably a dual temperature limit. In other words, switch 3 is preferably adjusted to: (1) close valve 4 at an increment above the temperature of combustion of the undesirable material, and (2) to open the same at a lower temperature above the temperature at which the combustion of the undesirable material is being sustained.

As set forth hereinbefore, the system derives the secondary fuel supply from the carbon material 35 and its chemical reaction with the incoming exhaust gases passing therethrough. Since the exhaust gases inherently contain water in the form of vapor and steam, the water will react with the carbon to form CO and $H_2$. To aid in this reaction a catalyst may be mixed among the carbon particles.

Also contemplated is using the valve 4 to vary the flow of fuel through the carbon intermediate between certain temperatures. For example, when the temperature within the catalyst retaining section 11 is high enough to sustain combustion of the undesirable material within the exhaust gases, the valve 4 may be shut down slowly to diminish the production of CO and $H_2$ and to thereby keep the temperature within the catalyst retaining section above that critical temperature but with a more efficient utilization of the carbon. This type of system is best suited for the embodiment utilizing a dual upper temperature limit, wherein flow of $H_2$ and CO could be diminished, but not shut off, between the two high limit temperatures.

The exhaust gas system of FIG. 1 operates in the following manner. Assuming the type of engine to which the exhaust gas system of FIG. 1 is used in conjunction with is a compression-ignition type engine, and the catalyst material is a platinum surface impregnated catalyst of spherical form and of 0.5 percent platinum by weight, it has been found that the combustion temperature of soot (which is generally considered the undesirable material in compression-ignition type engines and is therefore to be precluded in this example) in the pressure of the stream of exhaust gases in the catalyst conversion zone is approximately 700°. Thus, to make the system operative in eliminating soot, the turnoff temperature of switch 3 is set at 780° F. or an increment of 80° F. above the combustion temperature of soot and the high limit turn-on temperature is set at 760° F. Initially, at engine startup valve 3 is opened to the position as indicated by the dashed lines and thus a portion of the exhaust gases enter conduit 25 and are directed into manifold 32 of carbon chamber 5. The remaining exhaust gases pass through conduit 14 into the gas inlet means 10 of the converter. The gases pass conduit 26 through a reduced cross-sectional area which causes a reduction in pressure which in turn aids the flow of gases through the slip stream since the pressure at valve 4 is greater than at the point of reduced cross-sectional area. The portion of the exhaust gases, entering conduit 25, flow into the gas inlet means 32 of the carbon chamber 5 and, consequently, pass through the perforated wall 36, contacting carbon material 35, therein the reaction of hot $H_2O$ and carbon forms $H_2$ and CO. These secondary fuel gases as well as the remaining gases in the exhaust stream pass through wall 38 into outlet manifold 33, through conduit 26 to be admixed with the exhaust gases in conduit 14 and manifold 10. Subsequently, the total stream of exhaust gases pass into the catalyst retaining section or catalyst conversion zone 11 and there are oxidized to thus heat the conversion zone to a higher temperature than would otherwise be possible without the addition of the secondary fuel gases $H_2$ and CO. As the temperature rises to 780° F., which is above the temperature at which the combustion of soot is oxidized, valve is closed by the switch 3. Of course, above the shut-off temperature, soot, the undesirable material, is continuously being eliminated from the system by oxidation without the addition of a $H_2$ and CO. If the engine is operating at a temperature low enough to lower the temperature within the conversion zone below 760° F., the valve 4 will be reopened to supply these secondary gases again. For example, if the diesel engine is now placed in a mode of idle, the temperature of the exhaust gases from the engine will in most instances be lower than the 700° required to burn the soot within the exhaust gases. The cooler gases will tend to cool the converter below this temperature. But, with the present system, as the cool gases cool the converter below 760° F., the switch 3 will reopen the valve 4 to thus supply the secondary gases into the gas inlet section 10. With the additional raising the catalyst retaining section will maintain at least 760° F. and will thus maintain the temperature at which the soot will be burned from the exhaust gases.

It is also to be noted that in addition to arising the temperature of the converter, the addition of $H_2$ and Co may establish a secondary benefit, that being chemically reducing the oxides of nitrogen present in the exhaust stream to a non-noxious state. With that in mind, the embodiment of FIG. 2 is referred to in detail. It is especially adaptable for this latter purpose for it does not have a temperature shut-off valve incorporated therein and, thus, is always supplying some amount of CO and $H_2$ to the conversion zone of converter. The system comprises a converter 1' similar to the converter of FIG. 1, which has a catalyst retaining section 11', a gas inlet means or manifold 10' and a gas outlet means or manifold section 13'. The other details of converter 1' are not set forth here, but, it is assumed that they would be similar to the details of converter 1 of FIG. 1. Connected to converter 1' is conduit 50 which is connected to the exhaust system of the engine. Inserted directly into conduit 50 is a carbon chamber 5' which includes an outer housing 30', a carbon retaining section 31', which is shown to be of cartridge form removably placed into housing 30' via access panel 52. The cartridge 31' is maintained in place via projections 53. The cartridge 31' is disposed in housing 1 in a spaced relation to form an inlet means or manifold section 32' and an outlet means or manifold section 33'. The carbon material 35' within the carbon retaining section communicates with the inlet means 32' via wall 36' having perforations 37' therein, and with outlet means 33' via wall 38' having perforations 39' therein.

The operation of the system of FIG. 2 is simpler than that of FIG. 1, for there are no controls incorporated therein. The exhaust gases issuing from the engine pass through conduit 50, '. In contacting inlet manifold section 32', through perforations 37' into contact with the carbon 35'. In contacting the carbon 35', the water in the exhaust gases is dissociated and the carbon is partially oxidized to form gaseous $H_2$ and CO. These secondary fuel gases pass with the remaining gases through perforations 39' into outlet manifold section and consequently through the conversion zone or catalyst retaining section 11' of converter 1' where they are completely oxidized at higher temperatures than would be possible without the use of the carbon material. Of course, after the carbon is consumed in the systems of FIG. 1 and FIG. 2, it must be replaced either by refilling or replacing the cartridge.

It is readily seen that the principles incorporated in this improved exhaust system may be utilized with various types of engines, and catalyst materials, to eliminate from the catalyst various types of "poisons" or other forms of undesirable materials such as lead, barium, etc., which require higher temperatures to oxidize than can be supplied by the stream of exhaust gases and/or the oxidation of hydrocarbons emitted from the engine during some of the colder modes of engine operation. For other types of internal combustion engines, for other types of catalyst materials or types of undesirable materials, the limit temperatures at which switch 3 will, of course, have to be set to control the valve means will be different than given in the example of FIG. 1 as set forth above.

It may well be understood that various minor modifications in the design and/or location of the various components of this system may be made without diverting from the scope of the present invention. For example, the sensor means 2 may be placed in the gas inlet section 10.

We claim as our invention:

1. A method of catalytically treating a stream of exhaust gases containing water and soot emitted from a diesel engine to preclude the deposition of soot on a catalyst comprising the steps of:
   a. passing at least a portion of the untreated stream of exhaust gases through a carbon zone therein partially oxidizing the carbon and dissociating the water present in the exhaust gases to produce gaseous hydrogen and carbon monoxide; and,
   b. passing the resultant effluent from said carbon zone through a catalytic conversion zone, wherein said stream of gases is catalytically oxidized to a treated state, whereby the addition and subsequent oxidation of said gaseous hydrogen and carbon monoxide will raise the temperature of said conversion zone to sustain the combustion of said soot without the need of separate ignition means.

2. The method of claim 1 further characterized in that said steps are carried out below at least the temperature where the soot present in the stream of exhaust gases will be oxidized in the catalyst material zone.

3. The method of claim 1 further characterized in that said carbon zone contains a catalyst to catalyze the oxidation of carbon and dissociation of water reactions.

* * * * *